United States Patent Office 3,385,889
Patented May 28, 1968

3,385,889
PROCESS OF PREPARING CIS-β-HALOACRYLIC ACIDS
Carl Magnus Christoffer Rappe, Geijersgatan 3, Uppsala, Sweden
No Drawing. Filed Feb. 1, 1965, Ser. No. 429,665
Claims priority, application Sweden, Feb. 3, 1964, 1,285/64
4 Claims. (Cl. 260—539)

ABSTRACT OF THE DISCLOSURE

Pure cis-β-haloacrylic acids are prepared in good yield by reaction of a trichloro- or tribromo-acetone in the liquid or molten state with an aqueous solution of an inorganic base, in a mole ratio of at least the stoichiometric ratio.

The present invention relates to a process of preparing cis-β-haloacrylic acid by treatment of a trihaloacetone with a basic compound.

The preparation of only one geometric isomer (cis- or trans-) of unsaturated compounds has previously been combined with great difficulties, especially the thermodynamically unstable isomer. The accepted method for the preparation of these is the addition to a triple bond, and in this reaction often both isomers are formed. This makes a separation necessary. Only by using specific catalysts in this addition are successful additions performed with the addition in the wanted direction. Thus cis-β-haloacrylic acid, the thermodynamically unstable isomer, has been prepared by addition of hydrogen halide to acetylenic carboxylic acid using $Cu_2Cl_2$ as a catalyst (Science, vol. 141, p. 1192, 1963).

The preparation of geometric specific α,β-unsaturated β-haloacids by treatment of trihaloketones with a base according to the present invention, has previously not been studied nor discussed in the literature.

It has been of special interest, with a simple method and in good yields, to prepare cis-β-haloacrylic acid since this geometric isomer of the present compound is an efficient defoliant and desiccant (Science, vol. 141, p. 1192, 1963).

The invention has removed the difficulties in preparing pure cis-β-haloacrylic acid in good yield, and the process according to the invention is characterized in that a trihaloacetone with the formula $CHX_2COCH_2X$, in which X stands for halogen, is brought to react with an aqueous solution of an inorganic or organic base, the trihaloacetones being added dropwise to the solution at a temperature between 0–100° C., preferably room temperature, and the cis-β-haloacrylic acid formed in this reaction with the following structural formula

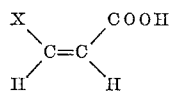

in which X has the same meaning as above, thereafter is isolated.

The trihaloacetone is used in a quality which is determined by nuclear magnetic resonance (NMR); however, crude tribromoacetone is also useful in the process. In experiments made according to the invention, the purity of the trihaloacetone has varied between 80 and 95%. The trihaloacetones, solid at room temperature, are melted before the addition to the base. The stoichiometric ratio between the trihaloacetone and the base is 1:3 and in the process according to the invention the ratio is suitably between 1:3 and 1:8, preferably 1:5.

The basic compound consists of sodium carbonate, sodium bicarbonate, potassium carbonate, potassium bicarbonate or calcium carbonate. The concentration of the base in the aqueous solution is preferably 1 molar or up to saturated solution, with the rest of the base undissolved.

The following examples are illustrative of the invention but are not intended to limit its scope.

EXAMPLE 1

0.2 mole (59 g.) of melted tribromoacetone (purity >95%, NMR) was added dropwise to a solution of 1.5 moles (126 g.) of sodium bicarbonate in 1.5 l. of water under vigorous stirring all the time. After 6 hours, the solution was extracted with ether (2×100 ml.) in a separatory funnel; after every extraction the two phases were allowed to separate. The ether phase was separated off and the aqueous phase was acidified to pH 1–2 with hydrochloric acid and was again extracted with ether (6×100 ml.). The combined ether extracts were dried, the ether distilled off, the last traces of ether being distilled off in vacuo (0.4 mm. Hg). The obtained crystalline residue had M.P. 55–59° C. and was 20.4 g. of cis-β-bromoacrylic acid, 68% yield of the theoretical value.

EXAMPLE 2

0.2 mole (33 g.) of trichloroacetone (purity 90%, NMR) was added dropwise to a solution of 1.5 moles (126 g.) of sodium bicarbonate in 1.5 l. of water under efficient stirring all the time. After 6 hours the solution was extracted with ether and the product isolated according to Example 1. The crystalline residue, hereby obtained, 15.0 g., M.P. 52–57° C., yield 80%, was recrystallized from 100 ml. of heptane. 12.1 g. of cis-β-chloroacrylic acid, M.P. 59–63° C. was obtained. Yield 63% calculated on the theoretical value.

The experiments, which are performed according to Example 1 but with different bases and haloketones are summarized in Table 1, where experimental conditions and results are set forth.

TABLE 1

| Example | Haloacetone Compound | Purity (NMR), Percent | Base | Ratio, haloacetone: base | Temp., °C. | Time, hr. | Yield, Percent | M.P., °C. |
|---|---|---|---|---|---|---|---|---|
| 1 | $CHBr_2COCH_2Br$ | >95 | $NaHCO_3$ | 1:7.5 | 20 | 3 | 68 | 55–59, crude product. |
| 2 | $CHCl_2COCH_2Cl$ | 90 | $NaHCO_3$ | 1:7.5 | 20 | 4 | 80 | 52–57, crude product. |
| 3 | $CHBr_2COCH_2Br$ | >95 | $Na_2CO_3$ | 1:5 | 20 | 2 | 63 | 56–59, crude product. |
| 4 | $CHBr_2COCH_2Br$ | >95 | $KHCO_3$ | 1:7.5 | 20 | 1½ | 69 | 56–59, crude product. |
| 5 | $CHCl_2COCH_2Cl$ | 80 | $NaHCO_3$ | 1:7.5 | 20 | 6 | 66 | 58–62, recryst. product. |
| 6 | $CHCl_2COCH_2Cl$ | 80 | $KHCO_3$ | 1:7.5 | 20 | 6 | 65 | 58–62, recryst. product. |
| 7 | $CHCl_2COCH_2Cl$ | 80 | $CaCO_3$ | 1:4 | 70 | 4 | 63 | 57–61, recryst. product. |
| 8 | $CHCl_2COCH_2Cl$ | 90 | $NaOH$ | 1:4 | 30 | (¹) | | Does not crystallize. |

¹ 15 min.

What I claim and desire to secure by Letters Patent is:
1. A process of preparing cis-β-haloacrylic acid having the formula

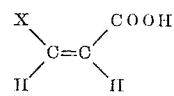

in which X is selected from the group consisting of Br and Cl, comprising the steps of reacting the corresponding trihaloacetone of the formula $CHX_2COCH_2X$, in which X has the same meaning as above, with an aqueous solution of an inorganic base selected from the group consisting of carbonates and bicarbonates of alkali metals and alkaline earth metals by adding said trihaloacetone dropwise to said solution at a temperature of 0 to 100° C., the mole ratio of said trihaloacetone to said base being from at least 1:3 to 1:8, and then isolating the cis-$\beta$-haloacrylic acid formed.

2. A process as in claim 1, wherein said mole ratio is 1:5.

3. A process as in claim 1, wherein said base is selected from the group consisting of sodium carbonate, sodium bicarbonate, potassium carbonate, potassium bicarbonate and calcium carbonate.

4. A process as in claim 1, wherein the concentration of said base in said aqueous solution is from 1 molar up to saturated solution, with the rest of the base undissolved.

References Cited
UNITED STATES PATENTS 3,227,542   1/1966   Kurtz _____ 260—539 XR LORRAINE A. WEINBERGER, *Primary Examiner.*

ALBERT P. HALLUIN, *Assistant Examiner.*